US012330708B2

(12) United States Patent
Degen et al.

(10) Patent No.: US 12,330,708 B2
(45) Date of Patent: Jun. 17, 2025

(54) MOBILE TRANSPORT SYSTEM

(71) Applicant: SEW-EURODRIVE GMBH & CO. KG, Bruchsal (DE)

(72) Inventors: Dirk Degen, Bruchsal (DE); Josef Schmidt, Philippsburg-Huttenheim (DE); Alexander Junginger, Remchingen-Wilferdingen (DE); Gero Bockelmann, Bruchsal (DE); Andreas Tuskan, Walzbachtal (DE); Jan-Patrick Ködderitzsch, Durmersheim (DE); Frank Erb, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 233 days.

(21) Appl. No.: 17/923,066

(22) PCT Filed: Apr. 15, 2021

(86) PCT No.: PCT/EP2021/059822
§ 371 (c)(1),
(2) Date: Nov. 3, 2022

(87) PCT Pub. No.: WO2021/223975
PCT Pub. Date: Nov. 11, 2021

(65) Prior Publication Data
US 2023/0166793 A1 Jun. 1, 2023

(30) Foreign Application Priority Data

May 5, 2020 (DE) ......................... 102020002676.1

(51) Int. Cl.
*B62D 15/02* (2006.01)
*B62D 7/02* (2006.01)
(Continued)

(52) U.S. Cl.
CPC ........... *B62D 15/021* (2013.01); *B62D 7/023* (2013.01); *B62D 7/04* (2013.01); *B62D 61/10* (2013.01)

(58) Field of Classification Search
CPC ...... B62B 3/001; B62D 7/023; B62D 15/021; B62D 63/02; B62D 7/02–08; B62D 61/00–10
See application file for complete search history.

(56) References Cited

U.S. PATENT DOCUMENTS 4,529,052 A * 7/1985 Imai .................... B62D 9/00
180/23
6,459,389 B1 * 10/2002 Germuth-Loffler .........................
G01D 5/2492
701/41
(Continued)

FOREIGN PATENT DOCUMENTS

DE 102007039611 B3 8/2008
DE 102012025152 A1 6/2014
(Continued)

OTHER PUBLICATIONS

Slip ring, 2019, Wikipedia, https://en.wikipedia.org/wiki/Slip_ring (Year: 2019).*
(Continued)

*Primary Examiner* — Mark L. Greene
(74) *Attorney, Agent, or Firm* — Carter, DeLuca & Farrell LLP

(57) ABSTRACT

A mobile transport system includes a drive unit having a first drive wheel rotatable about a first drive axis and a second drive wheel rotatable about a second drive axis, the drive axes extending in a transverse direction. The drive unit includes a swivel and a drive frame. The drive frame is pivotable about a steering axis relative to the swivel. The drive unit includes a marking carrier that is disposed in a
(Continued)

stationary manner relative to the drive frame, and on which optically detectable markings are applied. The drive unit includes a camera for detecting the markings and is disposed in a stationary manner relative to the swivel.

23 Claims, 3 Drawing Sheets

(51) Int. Cl.
　　　*B62D 7/04*　　　(2006.01)
　　　*B62D 61/10*　　　(2006.01)

(56) References Cited

U.S. PATENT DOCUMENTS

2008/0231701 A1　9/2008　Greenwood
2009/0052885 A1　2/2009　Cramer

FOREIGN PATENT DOCUMENTS

| DE | 102013019726 A1 | | 5/2015 |
| DE | 202014009461 U1 | | 3/2016 |
| DE | 102014015317 A1 | | 4/2016 |
| DE | 102016107451 A1 | * | 10/2016 |
| DE | 102017201108 A1 | | 7/2018 |
| EP | 0672994 A1 | | 9/1995 |
| WO | 2018136987 A1 | | 8/2018 |

OTHER PUBLICATIONS

Schwimmer H, DE 102017201108, machine translation. (Year: 2018).*
International Search Report issued in corresponding International Application No. PCT/EP2021/059822 dated Jul. 22, 2021, pp. 1-2, English Translation.
International Report on Patentability issued in corresponding International Application No. PCT/EP2021/059822 dated Nov. 8, 2022, pp. 1-8, English Translation.

* cited by examiner

MOBILE TRANSPORT SYSTEM

FIELD OF THE INVENTION

The present invention relates to a mobile transport system for transporting objects, e.g., in a technical plant. The system includes, for example, a drive unit having a first drive wheel rotatable about a first drive axis extending in a transverse direction and a second drive wheel rotatable about a second drive axis extending in the transverse direction.

BACKGROUND INFORMATION

In technical plants, for example, in production plants, mobile transport systems, e.g., autonomously driving mobile transport systems, are used for transporting objects such as small parts or crates. Such mobile transport systems bring components, among other things, from logistics areas, such as a material warehouse, to workstations where the components are processed. Certain mobile transport systems are able to overcome slight pitches or slopes and small ground sills or similar obstacles.

A mobile transport system is described in German Patent Document No. 10 2017 201 108 and is arranged as an industrial truck, including a first support wheel at a front end, a second support wheel at a rear end, and a drive wheel disposed between the support wheels. The first support wheel is disposed on a driving frame, while the second support wheel and the drive wheel are disposed on a swing frame. The swing frame is hinged on the driving frame by a horizontal swing axis.

German Patent Document No. 10 2012 025 152 describes an automated guided transport system including steering rollers and a drive unit disposed on a supporting part. The drive unit includes a wheel driven by an electric motor and is displaceable relative to the supporting part by a linear actuator.

A vehicle described in German Patent Document No. 10 2013 019 726 includes a frame on which a plurality of steering units are rotatably supported. The steering units each include a drive wheel, the wheel axis thereof being rotatably supported in a wheel axle support, the wheel axle support being rotatably supported by a swing axis.

German Patent Document No. 10 2014 015 317 describes a vehicle having a frame on which a receiving part is guided by a linear guide. The vehicle further includes a drive unit having drive wheels rotatably supported on a swing arm by a rotary bearing.

A suspension for transport devices described in PCT Patent Document No. WO 2018/136987 includes a wheel support pivotable about a vertical axis of rotation. Two wheels rotatable about a common axis of rotation are disposed on the wheel carrier.

SUMMARY

Example embodiments of the present invention provide a mobile transport system for transporting objects.

A mobile transport system according to an example embodiment of the present invention for transporting objects, e.g., in a technical system, includes a drive unit having a first drive wheel rotatable about a first drive axis extending in a transverse direction and a second drive wheel rotatable about a second drive axis extending in the transverse direction.

The drive unit includes a swivel and a drive frame, and the drive frame is pivotable about a steering axis relative to the swivel. The drive unit includes a marking carrier that is disposed relative to the drive frame in a stationary manner, and on which optically detectable markings are applied. The drive unit further includes a camera for detecting the markings disposed in a stationary manner relative to the swivel.

Optical detection of a pivot position of the drive unit is possible due to the configuration of the mobile transport system. In particular because of this it is possible to reliably and precisely detect alignment of the drive wheels relative to a vehicle frame of the mobile transport system. Detecting the instantaneous pivot position of the drive unit makes it possible to regulate this pivot position and the alignment of the drive wheels relative to the vehicle frame.

The mobile transport system, for example, also includes a vehicle frame and at least two support wheels that are rotatably supported.

According to example embodiments, the markings applied to the marking carrier contain information from which it is possible to determine a pivot angle of the drive frame relative to the swivel about the steering axis. The markings contain information about an absolute position, for example. It is thus not necessary to initialize the drive unit, for example, by approaching a defined reference position for the drive frame relative to the swivel.

According to example embodiments, the markings applied to the marking carrier are arranged as a barcode, e.g., a two-dimensional barcode, a QR code, etc. Such a barcode makes it possible to represent information securely and redundantly, so that it is possible to prevent a loss of information, even if specific details are incorrectly identified. A barcode of this type is described in European Patent Document No. 0 672 994, for example, which is expressly incorporated herein in its entirety by reference thereto.

According to example embodiments, the markings are applied to a surface of the marking carrier that faces away from the steering axis. This arrangement permits the camera to be disposed at a position removed from the steering axis. A central region about the steering axis is suitable for transmitting energy and data by a rotary transmitter when the camera is arranged outside of this central region.

The marking carrier is, for example, arranged, at least in part, between the steering axis and the camera. Because of this, the camera is disposed outside the central region about the steering axis, so that this central region can be used for transmitting energy and data by a rotary transformer.

The marking carrier is at least approximately rotationally symmetrical to the steering axis. The marking carrier, for example, surrounds the drive frame at least approximately concentrically. This makes it possible to precisely detect the pivot angle over a complete pivot range of 360°.

The steering axis extends vertically, perpendicular to the transverse direction. The vertical direction extends, for example, perpendicular to a floor on which the mobile transport system stands.

According to example embodiments, the drive unit includes an actuator motor for driving the drive frame relative to the swivel about the steering axis. A gearbox is, for example, provided, by which the actuator motor drives the drive frame about the steering axis. By controlling the actuating motor appropriately, it is possible to regulate the pivot position of the drive unit and the orientation of the drive wheels relative to the vehicle frame.

According to example embodiments, the first drive wheel is rotatably supported on a first swing arm pivotable about a first swing axis relative to the drive frame, and the second drive wheel is rotatably supported on a second swing arm pivotable about a second swing axis relative to the drive frame. The configuration of the mobile transport system makes it possible to compensate for uneven ground areas. The pivot motion of the swing arms about the swing axes when traveling across uneven ground areas ensures that both drive wheels always make contact with the ground and have a sufficiently high contact pressure. The use of springs is not necessary in order to achieve sufficiently high contact pressure of the drive wheels on the ground. The mobile transport system thus includes rigid kinematics, e.g., for preventing yielding or compliance when traveling across uneven ground areas.

According to example embodiments, the drive unit includes a first drive motor for driving the first drive wheel and a second drive motor for driving the second drive wheel, the first drive motor is disposed on the first swing arm, and the second drive motor is disposed on the second swing arm. Gearboxes are, for example, further provided, by which the drive motors drive the drive wheels. The gearboxes are also disposed on the swing arms. The drive motors and the gearboxes are disposed in an installation space between the drive wheels for saving space.

According to example embodiments, the first swing axis extends in the transverse direction and the second swing axis extends in the transverse direction. The first swing axis and the second swing axis are, for example, aligned to each other. The swing axes thus extend parallel to each other and parallel to the drive axes. A pivot motion of the swing arms about the swing axes thus brings about a displacement of the drive axes toward the ground or away from the ground.

According to example embodiments, the mobile transport system includes a vehicle frame and a swing frame pivotable about a swing axis relative to the vehicle frame, a pair of first support wheels are disposed on the vehicle frame, a pair of second support wheels are disposed on the swing frame, and the drive unit is disposed on the swing frame. The swing axis extends perpendicular to a vertical direction extending perpendicular to the transverse direction.

According to example embodiments, the swivel is attached to the swing frame in a stationary manner.

According to example embodiments, the drive unit includes a rotary transmitter by which electrical energy and data can be transmitted from the drive frame to the swing frame, and from the swing frame to the drive frame. To this end, the rotary transmitter includes at least one slip ring, for example.

The first support wheels are, for example, each supported relative to the vehicle frame rotatably about a first axis of rotation extending in a horizontal direction and relative to the vehicle frame pivotably about a first pivot axis extending in a vertical direction. The second support wheels are also, for example, each supported relative to the swing frame rotatably about a second axis of rotation extending in a horizontal direction and relative to the swing frame pivotably about a second pivot axis extending in a vertical direction.

The vertical direction extends perpendicular to the transverse direction. Horizontal directions extend perpendicular to the vertical direction. Support wheels implemented in such a manner are relatively inexpensive and also facilitate the mobile transport system traveling around curves.

According to example embodiments, one braking device is disposed on each of the two support wheels, by which a rotation of the corresponding second support wheel about a second axis of rotation extending in the horizontal direction can be braked. The braking devices can be electromagnetically actuated, for example. The second support wheels having the braking devices also continuously make contact with the ground. Braking of the mobile transport system is thus possible at all times, approximately independently of the condition of the ground. Additional braking devices at the first support wheels and/or at the drive wheels are not necessary.

Further features and aspects of example embodiments of the present invention are explained in greater detail below with reference to the appended schematic Figures.

DETAILED DESCRIPTION

Figure 1:
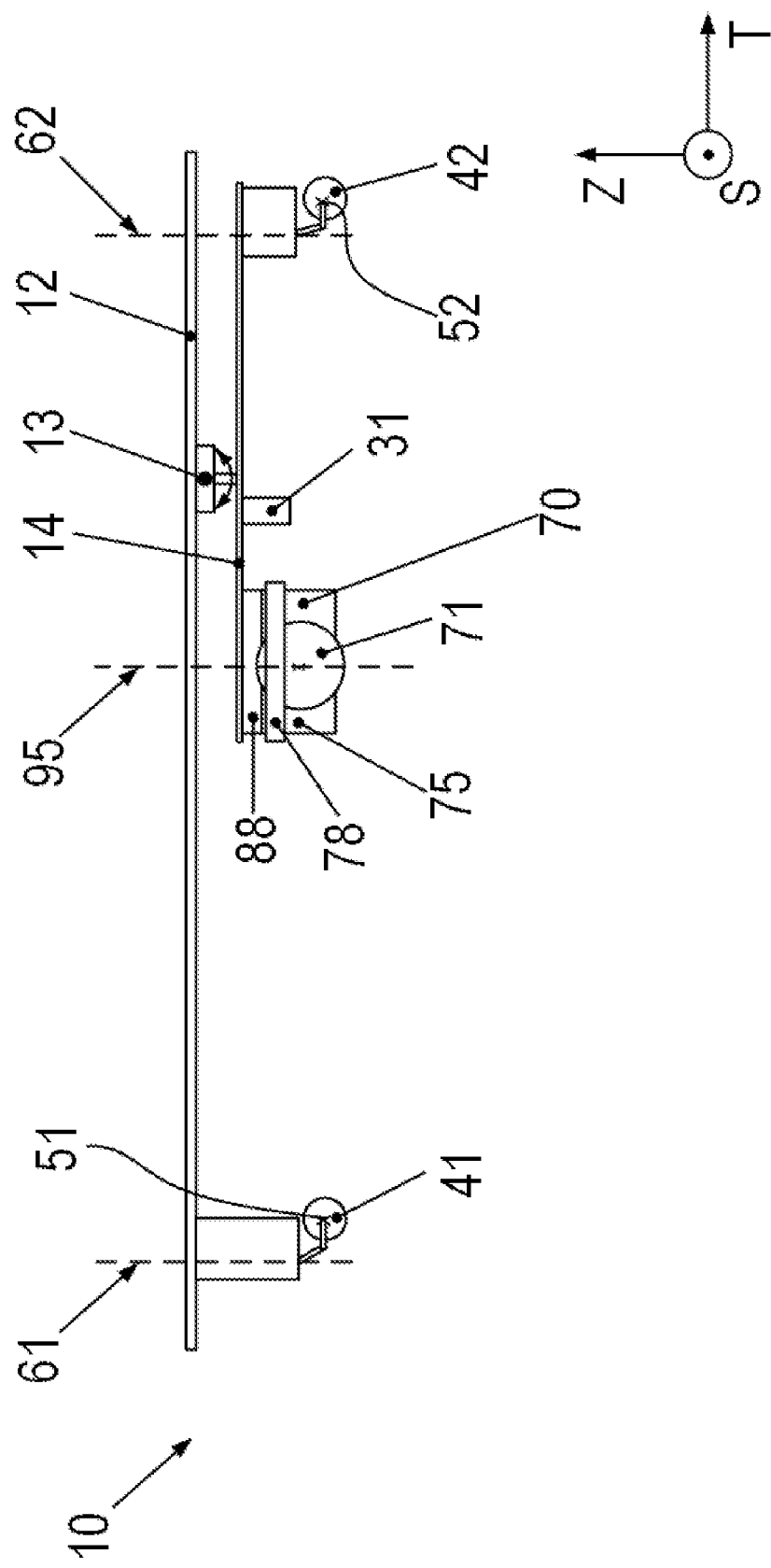
FIG. 1 is a schematic side view of a mobile transport system.

FIG. 1 is a schematic side view of a mobile transport system 10. The mobile transport system 10 is arranged for transporting objects in a technical plant. The technical plant is an industrial application, such as a production plant. The transport system 10 is also arranged, for example, for supplying goods to a residence of a private recipient in a city or in a residential region. For example, the mobile transport system 10 is an automated guided vehicle. For example, the mobile transport system 10 is present on a flat ground within a technical plant.

The mobile transport system 10 includes a vehicle frame 12 and a swing frame 14. The swing frame 14 is pivotable about a swing axis 13 relative to the vehicle frame 12. The swing axis 13 extends in the lateral direction S. The vehicle frame 12 includes an approximately rectangular cross section and extends predominantly in a base direction T and in the transverse direction S.

The base direction T corresponds at least approximately to the usual travel direction of the mobile transport system 10. The lateral direction S extends perpendicular to the base direction T. The base direction T and the lateral direction S are horizontal directions and extend parallel to the flat ground on which the mobile transport system 10 is present. A vertical direction Z stands perpendicular on the flat ground and thus extends perpendicular to the base direction T and perpendicular to the lateral direction S. Each direction perpendicular to the vertical direction Z is a horizontal direction.

Two first support wheels 41 are disposed on the vehicle frame 12 and are rotatable relative to the vehicle frame 12. The first support wheels 41 are disposed offset to each other in the lateral direction S. Two second support wheels 42 are disposed on the swing frame 14 and rotatable relative to the swing frame 14. The second support wheels 42 are disposed offset to each other in the lateral direction S.

The first support wheels 41 are each pivotable relative to the vehicle frame 12 about a first pivot axis 61 extending in a vertical direction Z. The first support wheels 41 are each further supported rotatably relative to the vehicle frame 12 about a first axis of rotation 51 extending in a horizontal direction. For example, the first axes of rotation 51 extend in the lateral direction S. Depending on a pivoting of the first support wheels 41 about the first pivot axis 61, the first axes of rotation 51 extend in the base direction T, for example, or in a different horizontal direction. The first pivot axis 61 and the first axis of rotation 51 of a first support wheel 41 do not intersect.

The second support wheels 42 are each pivotable relative to the swing frame 14 about a second pivot axis 62 extending in the vertical direction Z. The second support wheels 42 are each further supported rotatably relative to the swing frame 14 about a second axis of rotation 52 extending in a horizontal direction. For example, the second axes of rotation 52 extend in the lateral direction S. Depending on a pivoting of the second support wheels 42 about the second pivot axis 62, the second axes of rotation 52 extend in the base direction T, for example, or in a different horizontal direction. The second pivot axis 62 and the second axis of rotation 52 of a second support wheel 42 do not intersect.

The mobile transport system 10 includes a drive unit 70 disposed on the swing frame 14. The drive unit 70 includes a drive frame 75 and a swivel 88. The drive frame 75 is pivotable relative to the swivel 88 about a steering axis 95. The swivel 88 is attached to the swing frame 14. The drive frame 75 is thus pivotable relative to the swing frame 14 about a steering axis 95. The drive unit 70 is disposed between the first support wheels 41 and the second support wheels 42 in the base direction T.

The drive unit 70 furthermore includes a marking carrier 78 disposed on the drive frame 75 in a stationary manner. Optically detectable markings are applied to the marking carrier 78. The markings applied to the marking carrier 78 contain information from which a pivot angle of the drive frame 75 relative to the swivel 88 about the steering axis 95 can be determined. The drive unit 70 also includes a camera 31 for detecting the markings. The camera 31 is disposed in a stationary manner relative to the swivel 88 and is attached to the swing frame 14.

The drive unit 70 includes a first drive wheel 71 and a second drive wheel 72, both rotatably supported. The drive wheels 71, 72 are disposed between the first support wheels 41 and the second support wheels 42 in the base direction T. A distance between the second support wheels 42 and the swing axis 13 in a base direction T is at least approximately equal to a distance between the steering axis 95 and the swing axis 13 in the base direction T. The distance between the second support wheels 42 and the swing axis 13 in the base direction T thereby corresponds to the distance between the second pivot axes 62 and the swing axis 13 in the base direction T.

Figure 2:
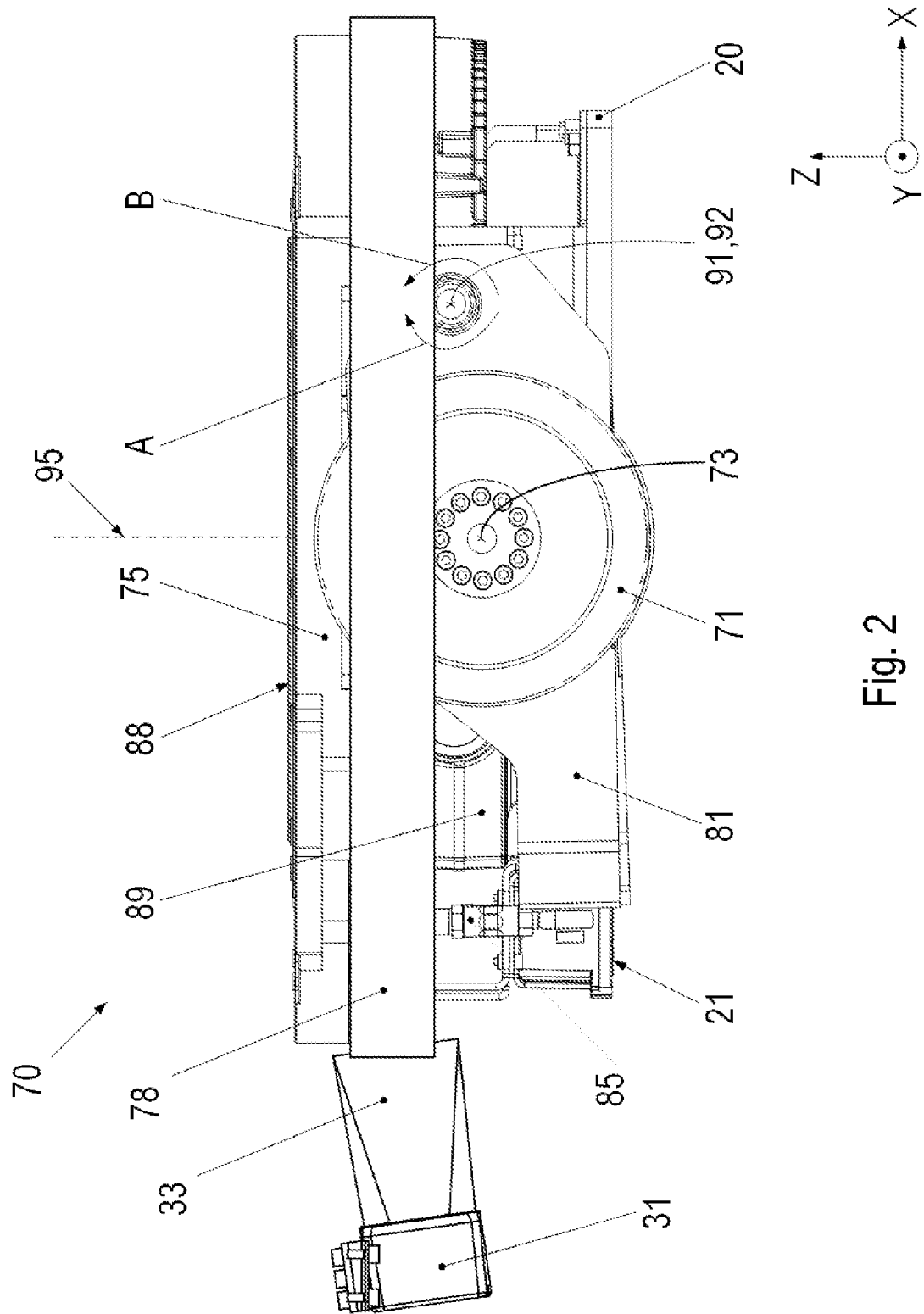
FIG. 2 is a schematic side view of a drive unit.

FIG. 2 is a side view of the drive unit 70. The marking carrier 78 is disposed partially between the steering axis 95 and the camera 31. The camera 31 is disposed spaced apart from the marking carrier 78. The markings are applied to a surface of the marking carrier 78 facing away from the steering axis 95. The surface faces the camera 31. Part of the marking carrier 78 is disposed in a detection cone 33 of the camera 31. Markings on the marking carrier 78 that are located in the detection cone 33 can be detected by the camera 31.

The drive unit 70 includes a first swing arm 81 pivotable relative to the drive frame 75 about a first swing axis 91 and a second swing arm 82 pivotable relative to the drive frame 75 about a second swing axis 92. The first swing axis 91 and the second swing axis 92 extend in a transverse direction Y and are aligned to each other. The swing arms 81, 82 are each pivotable relative to the drive frame 75 in a first pivot direction A and in a second pivot direction B aligned opposite the first pivot direction A about the swing axes 91, 92.

The transverse direction Y extends perpendicular to the vertical direction Z. A longitudinal direction X extends perpendicular to the vertical direction Z and perpendicular to the transverse direction Y. The longitudinal direction X and the transverse direction Y are horizontal directions. Each direction perpendicular to the vertical direction Z is a horizontal direction. As previously mentioned, the drive frame 75 of the drive unit 70 is pivotable relative to the swivel 88 and to the swing frame 14 of the mobile transport system 10 about the steering axis 95. Depending on a pivot motion of the drive frame 75 about the steering axis 95, an alignment of the drive frame 75 changes relative to the vehicle frame 12 and relative to the swing frame 14. For example, the longitudinal direction X corresponds to the base direction T, and the transverse direction Y corresponds to the lateral direction S.

The first drive wheel 71 is rotatably supported on the first swing arm 81 about a first drive axis 73 extending in the transverse direction Y. The second drive wheel 72 is rotatably supported on the second swing arm 82 about a second drive axis 74 extending in the transverse direction Y. The drive axes 73, 74 thus extend parallel to the swing axes 91, 92 but are offset parallel relative to the same. Due to pivot motions of the swing arms 81, 82 about the swing axes 91, 92, the drive axes 73, 74 are displaceable relative to each other perpendicular to the transverse direction Y. The drive axes 73, 74 intersect the steering axis 95, at least approximately.

The drive unit 70 includes a receiving unit 20 disposed on the drive frame 75 and to which energy can be transmitted inductively from a charging unit. The charging unit is implemented as a linear conductor or as a coil, for example. The energy inductively transmitted from the charging unit to the receiving unit 20 serves, for example, for charging an electrical energy store of the mobile transport system 10.

The drive unit 70 further includes an inductive sensor 21 disposed on the drive frame 75. The inductive sensor 21 serves for detecting a magnetic field. When the magnetic field is generated by a linear conductor arranged in the ground, for example, the inductive sensor 21 provides for following the linear conductor in order to reach a particular destination.

The drive unit 70 also includes a rotary transmitter 94. The rotary transmitter 94 includes slip rings, for example, by which electrical energy and data can be transmitted from the drive frame 75 to the swivel 88 and to the swing frame 14. Electrical energy and data can also be transmitted from the swivel 88 and from the swing frame 14 to the drive frame 75 by the slip rings.

Figure 3:
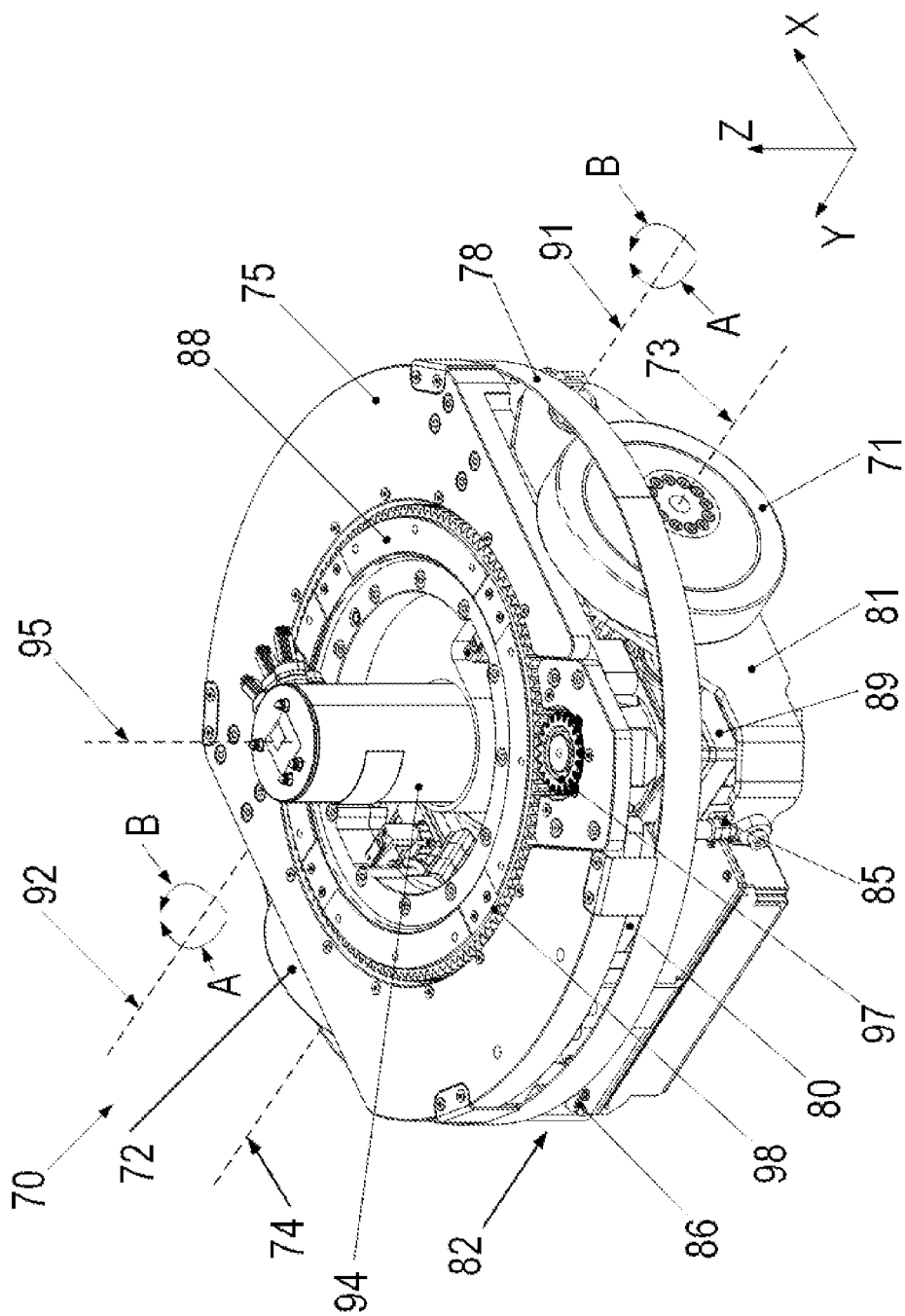
FIG. 3 is a schematic perspective view of a drive unit.

FIG. 3 is a perspective view of the drive unit 70. The marking carrier 78 is arranged at least approximately rotationally symmetrical to the steering axis 95 and surrounds the drive frame 75 at least approximately concentrically. As mentioned above, the markings are applied to a surface of the marking carrier 78 facing away from the steering axis 95.

The drive unit 70 includes an actuator motor 89 for driving the drive frame 75 relative to the swivel 88 about the steering axis 95. The actuator motor 89 is disposed in a stationary manner on the drive frame 75 and operationally connected to a gearbox, by which the actuator motor 89 drives the drive frame 75 relative to the swivel 88. The gearbox includes a pinion 97 disposed on the drive frame 75 in a stationary manner and a crown gear 98. The crown gear 98 is disposed on the swivel 88 in a stationary manner. The pinion 97 meshes with the crown gear 98. The actuator motor 89 drives the pinion 97, which meshes with the crown gear 98.

The rotary transmitter 94 includes an approximately rotationally symmetrical, e.g., cylindrical, base body. A cylinder axis of the base body of the rotary transmitter 94 extends in the vertical direction Z and is aligned with the steering axis 95. The rotary transmitter 94 is disposed on the drive frame 75 in a stationary manner and is pivotable relative to the swivel 88 about the steering axis 95. It is also possible that the rotary transmitter 94 is disposed on the swivel 88 in a stationary manner and is pivotable relative to the drive frame 75 about the steering axis 95.

The drive unit 70 includes a coupling unit having a rocker 80 pivotable about a coupling axis relative to the drive frame 75, a first strut 85, and a second strut 86. The first swing arm 81 is connected to the rocker 80 by the first strut 85. The second swing arm 82 is connected to the rocker 80 by the second strut 86. The coupling axis extends in the longitudinal direction X. The first swing arm 81 and the second swing arm 82 are thus coupled to each other by the coupling unit.

When the first drive wheel 71 travels into a ground protrusion, for example, the first drive wheel 71 is displaced upward in the vertical direction Z. The first swing arm 81 is pivoted about the first swing axis 91 in the first pivot direction A. The first swing arm 81 brings about a pivot motion of the rocker 80 about the coupling axis by the first strut 85. The rocker 80 brings about a pivot motion of the second swing arm 82 about the second swing axis 92 in the second pivot direction B by the second strut 86. The second drive wheel 72 is displaced downward in the vertical direction Z.

For the described procedure, the drive wheels 71, 72 are not displaced exclusively in the vertical direction Z, but also slightly in the longitudinal direction X. Due to the geometric arrangement of the swing arms 81, 82 and the swing axes 91, 92, the motion of the drive wheels 71, 72 in the longitudinal direction is negligible, however, in comparison with the motion in the vertical direction Z.

The first swing arm 81 and the second swing arm 82 are thus coupled to each other by the coupling unit, such that a pivot motion of the first swing arm 81 about the first swing axis 91 in the first pivot direction A brings about a pivot motion of the second swing arm 82 about the second swing axis 92 in the second pivot direction B. The first swing arm 81 and the second swing arm 82 are also coupled to each other by the coupling unit, such that a motion of the first drive wheel 71 upward in the vertical direction Z brings about a motion of the second drive wheel 72 downward in the vertical direction Z, and vice versa.

The first strut 85 and the second strut 86 extend at least approximately in the vertical direction Z. The first strut 85 and the second strut 86 are each adjustable in length independently of each other. This means that an extent of the struts 85, 86 in the vertical direction Z is adjustable.

The drive unit 70 includes a tilt sensor for capturing a tilt of the rocker 80 relative to the drive frame 75 about the coupling axis. The drive unit 70 includes a tilt sensor for capturing a tilt of the first swing arm 81 relative to the drive frame 75 about the first swing axis 91. The drive unit 70 includes a tilt sensor for capturing a tilt of the second swing arm 82 relative to the drive frame 75 about the second swing axis 92.

LIST OF REFERENCE CHARACTERS

10 Mobile transport system
12 Vehicle frame
13 Swing axis
14 Swing frame
20 Receiving unit
21 First inductive sensor
31 Camera
33 Detection cone
41 First support wheel
42 Second support wheel
51 First axis of rotation
52 Second axis of rotation
61 First pivot axis
62 Second pivot axis
70 Drive unit
71 First drive wheel
72 Second drive wheel
73 First drive axis
74 Second drive axis
75 Drive frame
78 Marking carrier
80 Rocker
81 First swing arm
82 Second swing arm
85 First strut
86 Second strut
88 Swivel
89 Actuator motor
91 First swing axis
92 Second swing axis
94 Rotary transmitter
95 Steering axis
97 Pinion
98 Crown gear
A First pivot direction
B Second pivot direction
S Lateral direction
T Base direction
X Longitudinal direction
Y Transverse direction
Z Vertical direction

The invention claimed is:

1. A mobile transport system, comprising:
a drive unit including:
   a swivel;
   a drive frame pivotable about a steering axis relative to the swivel;
   a first drive wheel rotatable about a first drive axis extending in a transverse direction and rotatably supported on a first swing arm pivotable relative to the drive frame about a first swing axis extending in the transverse direction;
   a second drive wheel rotatable about a second drive axis extending in the transverse direction and rotatably supported on a second swing arm pivotable relative to the drive frame about a second swing axis extending in the transverse direction;
   a marking carrier arranged in a stationary manner relative to the drive frame and including optically detectable markings;
   a camera adapted to detect the markings arranged in a stationary manner relative to the swivel; and
   a coupling unit including a rocker pivotable relative to the drive frame about a coupling axis that extends in a longitudinal direction perpendicular to the transverse direction;
wherein the first swing arm is connected to a first end of the rocker and the second swing arm is connected to a second end of the rocker opposite the first end so that movement of a first one of the first swing arm and the second swing arm in a first direction perpendicular to the transverse direction and perpendicular to the longitudinal direction causes movement of a second one of the first swing arm and the second swing arm in a second direction perpendicular to the transverse direction, perpendicular to the longitudinal direction, and opposite the first direction.

2. The mobile transport system according to claim 1, wherein the mobile transport system is adapted to transport objects in a technical system.

3. The mobile transport system according to claim 1, wherein the markings include information from which it is possible to determine a pivot angle of the drive frame relative to the swivel about the steering axis.

4. The mobile transport system according to claim 1, wherein the markings include a barcode, a two-dimensional barcode, and/or a QR code.

5. The mobile transport system according to claim 1, wherein the markings are arranged on a surface of the marking carrier that faces away from the steering axis.

6. The mobile transport system according to claim 1, wherein the marking carrier is disposed, at least in part, between the steering axis and the camera.

7. The mobile transport system according to claim 1, wherein the marking carrier is at least approximately rotationally symmetrical to the steering axis.

8. The mobile transport system according to claim 1, wherein the marking carrier surrounds the drive frame at least approximately concentrically.

9. The mobile transport system according to claim 7, wherein the marking carrier surrounds the drive frame at least approximately concentrically.

10. The mobile transport system according to claim 1, wherein the steering axis extends vertically, perpendicular to the transverse direction.

11. The mobile transport system according to claim 1, wherein the drive unit includes an actuator motor adapted to drive the drive frame relative to the swivel about the steering axis.

12. The mobile transport system according to claim 1, wherein the drive unit includes a first drive motor adapted to drive the first drive wheel and a second drive motor adapted to drive the second drive wheel, the first drive motor being disposed on the first swing arm, the second drive motor being disposed on the second swing arm.

13. The mobile transport system according to claim 1, further comprising:
a vehicle frame;
a swing frame pivotable about a swing frame axis relative the vehicle frame;
a pair of first support wheels disposed on the vehicle frame; and
a pair of second support wheels disposed on the swing frame;
wherein the drive unit is disposed on the swing frame, and the swing frame axis extends perpendicular to a vertical direction extending perpendicular to the transverse direction.

14. The mobile transport system according to claim 13, wherein the swivel is attached in a stationary manner to the swing frame.

15. The mobile transport system according to claim 13, wherein the drive unit includes a rotary transmitter adapted to transmit electrical energy and data between the drive frame and the swing frame.

16. The mobile transport system according to claim 13, wherein the drive unit includes a rotary transmitter adapted to transmit electrical energy and data from the drive frame to the swing frame and from the swing frame to the drive frame.

17. The mobile transport system according to claim 13, wherein each first support wheel is supported relative to the vehicle frame rotatably about a first axis of rotation extending in a horizontal direction and relative to the vehicle frame pivotably about a first pivot axis extending in the vertical direction that extends perpendicular to the transverse direction.

18. The mobile transport system according to claim 13, wherein each second support wheel is supported relative to the swing frame rotatably about a second axis of rotation extending in a horizontal direction and relative to the swing frame pivotably about a second pivot axis extending in the vertical direction that extends perpendicular to the transverse direction.

19. The mobile transport system according to claim 17, wherein each second support wheel is supported relative to the swing frame rotatably about a second axis of rotation extending in a horizontal direction and relative to the swing frame pivotably about a second pivot axis extending in the vertical direction.

20. The mobile transport system according to claim 1, wherein the first swing arm is connected to the first end of the rocker by a first strut, and the second swing arm is connected to the second end of the rocker by a second strut.

21. The mobile transport system according to claim 1, wherein the drive unit includes a tilt sensor adapted to detect a tilt of the rocker relative to the drive frame about the coupling axis.

22. The mobile transport system according to claim 1, wherein the drive unit includes a tilt sensor adapted to detect a tilt of the first swing arm relative to the drive frame about the first swing axis.

23. The mobile transport system according to claim 22, wherein the drive unit includes a further tilt sensor adapted to detect a tilt of the second swing arm relative to the drive frame about the second swing axis.

* * * * *